(12) United States Patent
Rocchetti et al.

(10) Patent No.: US 7,617,273 B2
(45) Date of Patent: Nov. 10, 2009

(54) METHOD AND APPARATUS FOR PROVIDING A UNIFIED COMPONENT ARCHITECTURE FOR CLIENT-SIDE AND SERVER-SIDE COMPONENTS

(75) Inventors: Robert J. Rocchetti, Los Altos, CA (US); Jeffrey P. Kesselman, Santa Clara, CA (US); Hideya Kawahara, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 908 days.

(21) Appl. No.: 10/295,728

(22) Filed: Nov. 15, 2002

(65) Prior Publication Data

US 2004/0098450 A1    May 20, 2004

(51) Int. Cl.
*G06F 15/16* (2006.01)
(52) U.S. Cl. .................................................... 709/203
(58) Field of Classification Search ............... 709/203; 717/116, 107
See application file for complete search history.

(56) References Cited

U.S. PATENT DOCUMENTS

| | | | | | |
|---|---|---|---|---|---|
| 4,642,758 | A | * | 2/1987 | Teng | 707/10 |
| 6,141,010 | A | * | 10/2000 | Hoyle | 715/854 |
| 6,332,163 | B1 | * | 12/2001 | Bowman-Amuah | 709/231 |
| 7,389,350 | B2 | * | 6/2008 | Charters et al. | 709/227 |
| 2002/0013832 | A1 | * | 1/2002 | Hubbard | 709/220 |
| 2002/0049749 | A1 | * | 4/2002 | Helgeson et al. | 707/3 |
| 2002/0102965 | A1 | * | 8/2002 | Mandahl et al. | 455/412 |
| 2003/0084097 | A1 | * | 5/2003 | Messinger et al. | 709/203 |
| 2003/0167353 | A1 | * | 9/2003 | de Bonet et al. | 709/318 |
| 2004/0024787 | A1 | * | 2/2004 | Edwards et al. | 707/200 |
| 2004/0025168 | A1 | * | 2/2004 | Edwards et al. | 719/315 |
| 2004/0078495 | A1 | * | 4/2004 | Mousseau et al. | 710/1 |

OTHER PUBLICATIONS

Publication entitled "Using WebLogic's Distributed Server-Side Beans", XP-002275328, Published Nov. 7, 2000, pp. 1-11, http://web.archive.org/web/20000711092707/http://www.weblogic.com.
Publication entitled "Frequently Asked Questions about Jumping Beans", XP-002275329, Published Jul. 7, 2002, pp. 1-11, http://web.archive.org/web/20020707122533/http;//www.jump.
Publication entitled "Client Side Reconfiguration on Software Components for Load Balancing", by Erik Putrycz et al., XP-002961212, 2001, IEEE, pp. 111-116.
Publication entitled "White Paper Introduction to Orbix E2A J2EE Technology", XP-002275330, IONA Technologies PLC, Apr. 2002, pp. 1-21.

* cited by examiner

*Primary Examiner*—Nathan J Flynn
*Assistant Examiner*—Chirag R Patel
(74) *Attorney, Agent, or Firm*—Park, Vaughan & Fleming, LLP

(57) ABSTRACT

One embodiment of the present invention provides a system that facilitates deploying components on a client. During operation, the system establishes a communication session through a network connection between the client and a server. Next, the system migrates components from the server to the client, wherein the components provide services and are able to use services provided by other components. Finally, the client installs the components on the client, thereby allowing the components to provide services on the client. Note that by supporting deployment of components on the client in this way, the system facilitates a unified component architecture across the client and the server.

34 Claims, 4 Drawing Sheets

METHOD AND APPARATUS FOR PROVIDING A UNIFIED COMPONENT ARCHITECTURE FOR CLIENT-SIDE AND SERVER-SIDE COMPONENTS

BACKGROUND

1. Field of the Invention

The present invention relates to component-based programming architectures. More specifically, the present invention relates to a method and an apparatus for providing a unified component architecture for both client-side and server-side programming components.

2. Related Art

As networked computing devices, such as personal digital assistants (PDAs) and cell phones, grow increasingly more popular, developers are beginning to deploy a large number of services to operate with these portable computing devices. Unfortunately, developing such services involves writing complicated client-side and server-side software. Dealing with the complexity of this software requires a large amount of programmer time, which results in considerable cost and delay.

Component-based architectures, such as the Enterprise Java Bean (EJB) architecture developed by SUN Microsystems, Inc. of Santa Clara Calif., have been developed to manage the complexity involved in developing server-based middleware applications. A component-based architecture allows an application to be decomposed into dynamic "components" that interact with each other through well-defined interfaces. This allows programmers to work independently from each other, and also makes applications easier to maintain and test. Moreover, components are persistent, which means they can be reused again in different applications without having to be recompiled.

For example, referring the FIG. 1A, a middle-tier server 121 supports an EJB container 108, which enables various EJB instances 109-111 to execute. For example, EJB container 108 can provide services to manage security and system resources for EJB instances 109-111.

Similarly, components can also be deployed within Enterprise Information System (EIS) tier server 122 to provide services to components in middle-tier server 121. For example, referring to FIG. 1A, EJB instance 111 from middle-tier server 121 makes use of services provided by EJB instance 116 within EJB container 114 on EIS-tier server 122. EJB instance 116 itself makes use of services provided by other EJB instances 115 and 117 within the same EJB container 114.

An application (or applet) 126 running on a client 120 can be configured to access services provided by the components on servers 121 and 122. For example, application 126 within client 120 can contain code that marshals method invocations before they are sent to middle-tier server 121. At the same time, web services application 124 can contain corresponding code that unmarshals the method invocations before they are sent to the components on middle-tier server 121.

Note that application 126, web services application 124 and components within EJB container 108 are typically developed by different programmers using different programming paradigms. Hence, it is typically a challenging task to get these programmers to effectively collaborate to enable application 126 to communicate with components in middle-tier server 121.

Furthermore, it is a difficult task to deploy a service across multiple clients and servers. Capabilities can vary greatly between different client devices. Moreover, characteristics of network connections between clients and server can vary. Both of these factors can influence the decision about what type of functionality should be deployed to a given client.

Hence, what is needed is a method and an apparatus, which allows client applications to make use of services provided by components without the above-described problems.

SUMMARY

One embodiment of the present invention provides a system that facilitates deploying components on a client. During operation, the system establishes a communication session through a network connection between the client and a server. Next, the system migrates components from the server to the client, wherein the components provide services and are able to use services provided by other components. Finally, the client installs the components on the client, thereby allowing the components to provide services on the client. Note that by supporting deployment of components on the client in this way, the system facilitates a unified component architecture across the client and the server.

In a variation on this embodiment, migrating components from the server to the client involves sending information to the server specifying capabilities of the client device, and then allowing the server to identify components to migrate to the client based upon the capabilities of the client device, and based on capabilities of the network connection between the client and the server. It also involves transferring the identified components from the client to the server.

In a further variation, transferring identified components from the client to the server involves first receiving a list of components to migrate, and then transferring components in the list from the server to the client.

In a variation on this embodiment, migrating components from the server to the client involves sending information to the server specifying the status of currently installed components on the client, thereby allowing the server to identify components to migrate to the client based upon the status of currently installed components. It also involves transferring identified components from the server to the client.

In a variation on this embodiment, the status of currently installed components on the client includes version information for the currently installed components. The server uses this version information to determine if there exist updated versions of currently installed components on the client. This allows the server to migrate the updated versions to the client, if such updated versions exist.

In a variation on this embodiment, components to be migrated are stored in a database, so that migration takes place as part of normal database synchronization between the client and the server.

In a variation on this embodiment, migrating components from the server to the client involves migrating components when the network connection between the client and the server has available capacity.

In a variation on this embodiment, a given component includes a deployment descriptor specifying conditions used to determine whether the given component should be deployed on the client or the server.

In a variation on this embodiment, prior to establishing the communication session between the client and the server, the system updates a client virtual machine upon which the components execute, if the currently installed client virtual machine is outdated.

In a variation on this embodiment, prior to establishing the communication session between the client and the server, the system updates a container within which the components execute on the client, if the container is outdated.

In a variation on this embodiment, the system additionally synchronizes data between the client and the server.

In a variation on this embodiment, the client is a wireless device, and the network connection between the client and the server is a wireless network connection.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Unified Component Architecture

Figure 1A:
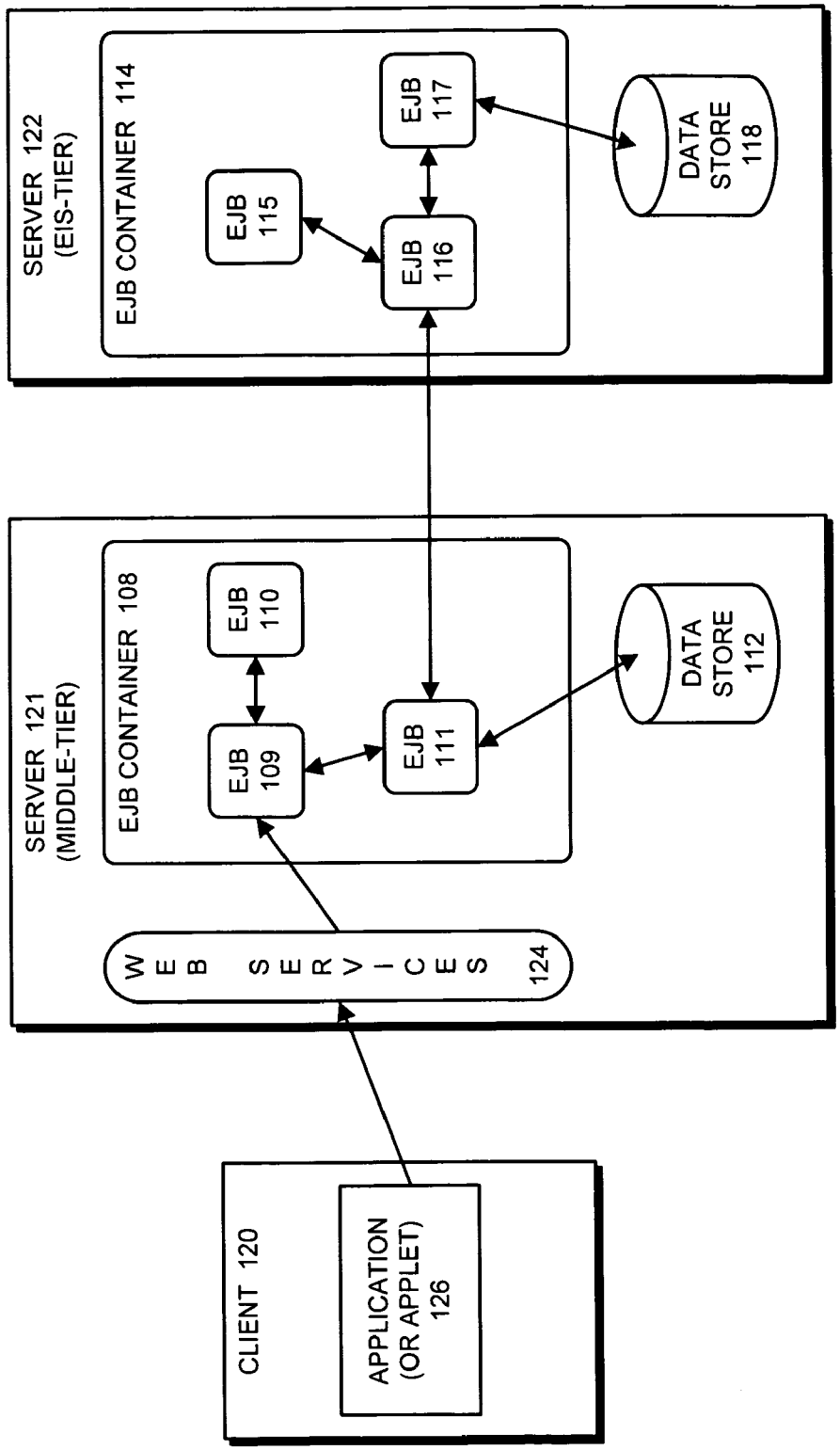
FIG. 1A illustrates a multi-tier architecture for a distributed computing system.
Figure 1B:
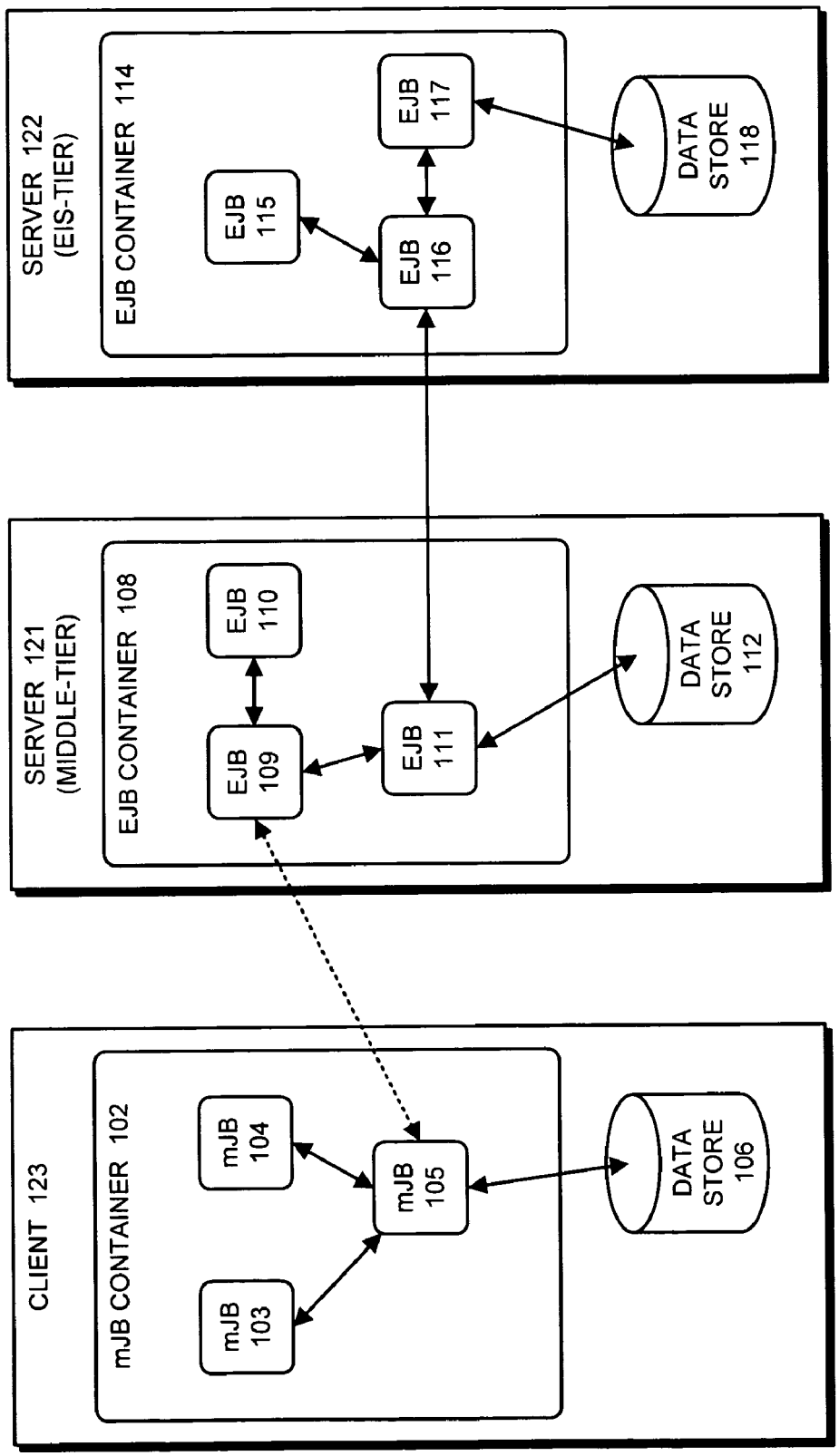
FIG. 1B illustrates a multi-tier architecture for a distributed computing system in accordance with an embodiment of the present invention.

FIG. 1B illustrates a unified component architecture within a multi-tiered architecture for a distributed computing system in accordance with an embodiment of the present invention. This multi-tiered architecture includes a client-tier that operates on client 123, a middle-tier that operates on server 121 and an Enterprise Information System (EIS) tier that operates on server 122. Servers 121 and 122 can generally includes any type of computer system that includes a mechanism for servicing requests from clients for computational and/or data storage resources. Client 123 can generally include any type of computer system, including, but not limited to, a computer system based on a microprocessor, a mainframe computer, a digital signal processor, a portable computing device, a personal organizer, a device controller, and a computational engine within an appliance. Client 123 can also include a computer system within a cellular telephone.

As was discussed above with reference to FIG. 1A, server 121 supports EJB container 108 in which various EJB instances 109-111 can execute. Moreover, EJB container 108 and EJB instances 109-111 can access non-volatile storage within data store 112.

Similarly, server 122 supports EJB container 114 in which various EJB instances 115-117 can execute, and EJB container 114 and EJB instances 115-117 can access non-volatile storage within data store 118.

Unlike existing client computer systems, client 123 illustrated in FIG. 1B supports a mobile Java Bean (mJB) container 102 in which various mJB instances 103-105 can execute. mJB container 102 and mJB instances 103-105 can access non-volatile storage within data store 106.

Note that mJB container 102 is similar to existing EJB containers, except that it may run on a computing device with limited resources, such as a cell phone or a Personal Digital Assistant (PDA). Hence, mJB container 102 is only able to implement a limited subset of the services provided within an EJB container. Similarly mJB instances 103-105 are similar to EJB instances, except that mJB instances are able to operate using the limited resources and services provided by client 123 and mJB container 102. Note that the system can dynamically determine at run-time whether a specific component (EJB) can be migrated to client 123 to execute as an mJB instance.

Note the some components have to reside on client 123, while other components have to reside on server 121, while yet other components may reside on either client 123 or server 121. For example, some components may require access to an Application Programming Interface (API) for a user interface, which is only available on client 123, while other components require access to an API for a database, which is only available on server 121. Yet other components, which do not access device-specific APIs, can reside on either server 121 or client 123, if adequate resources are available on client 123.

The system determines whether to migrate a specific component to client 123 after considering such factors as the capabilities of client 123, and the capabilities of the network connection between client 123 and server 121. This process of selectively migrating components to client 123 is described in more detail below with reference to FIGS. 2-4.

Client

Figure 2:
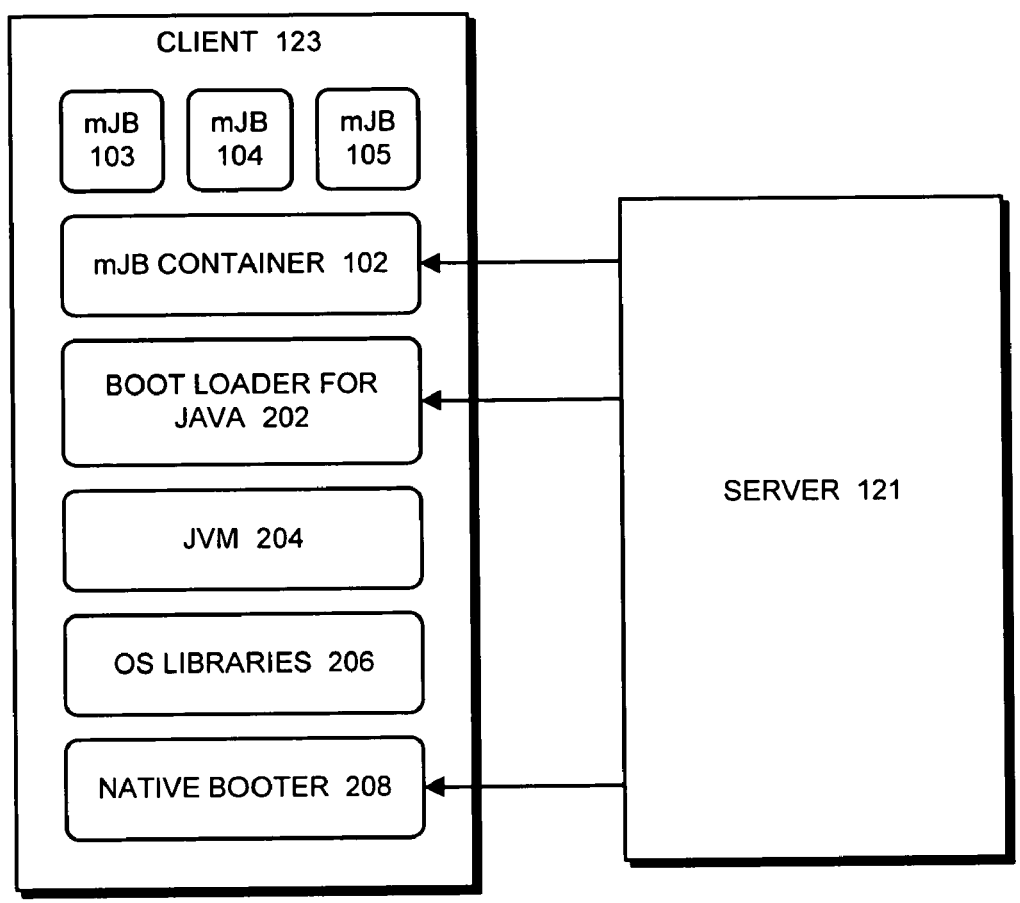
FIG. 2 illustrates a client in accordance with an embodiment of the present invention.

FIG. 2 illustrates features of client 123 in accordance with an embodiment of the present invention. Client 123 includes a native booter 208, which coordinates operations involved in initializing client 123 so that client 123 can execute native code. Once client 123 is initialized to execute native code, operating system (OS) libraries 206 and Java Virtual Machine™ (JVM) 204 can execute. Client 123 can also receive updates to OS libraries 206 or JVM 204 from server 121 if such updates are available. Note that JVM 204 can execute applications written in the JAVA™ programming language. (The terms "Java" and "Java Virtual Machine" are registered trademarks of SUN Microsystems, Inc. of Santa Clara, Calif.)

After JVM 204 is able to execute, the system runs boot loader for Java 202, which causes mJB container 102 to be loaded (or updated if it is already loaded).

mJB container 102 provides support for mJB instances 103-105, which may involve migrating mJB instances 103-105 from server 121 to mJB container 102 as is described below with reference to FIGS. 3-4.

Process of Initializing Client

Figure 3:
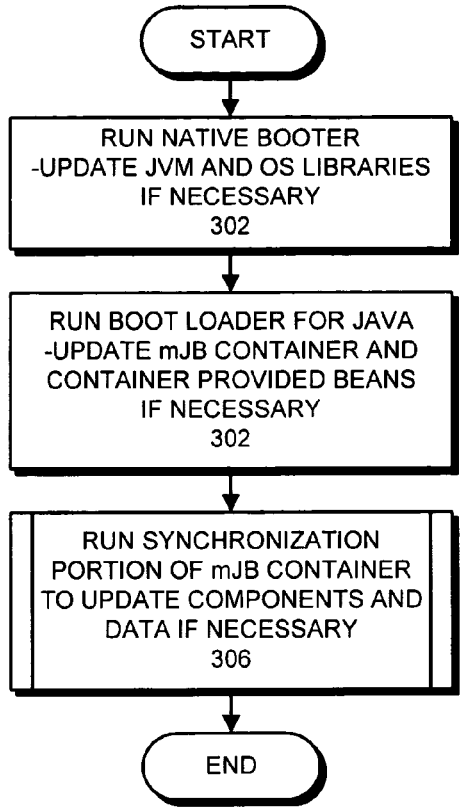
FIG. 3 presents a flow chart illustrating the process of initializing a client in accordance with an embodiment of the present invention.

FIG. 3 presents a flow chart illustrating the process of initializing client 123 in accordance with an embodiment of the present invention. The system starts by running native booter 208 on client 123, which enables JVM 204 to execute (step 302). Note that native booter can also update OS libraries 206 and JVM 204 if updates are available on server 121.

Next, the system runs boot loader for Java 202 (step 304). Boot loader for Java 202 updates mJB container 102 as well as container provided beans, if such updates are available on server 121.

Finally, the system runs the synchronization portion of mJB container 102 (step 306). This synchronization portion migrates components from server 121 to mJB container 102. It also updates components and within mJB container 102 and also updates data, if such updates are necessary. This process is described in more detail below with reference to FIG. 4.

Note that native booter 208 and boot loader for Java 202 are executed only during initialization of client 123, for example after client 123 is powered on. In contrast, the synchronization portion of mJB container 102 can execute periodically during system operation to dynamically migrate components to client 123 and update data items on client 123. This allows components to be dynamically migrated from server 121 to client 123 as they are required.

Process of Component Migration

Figure 4:
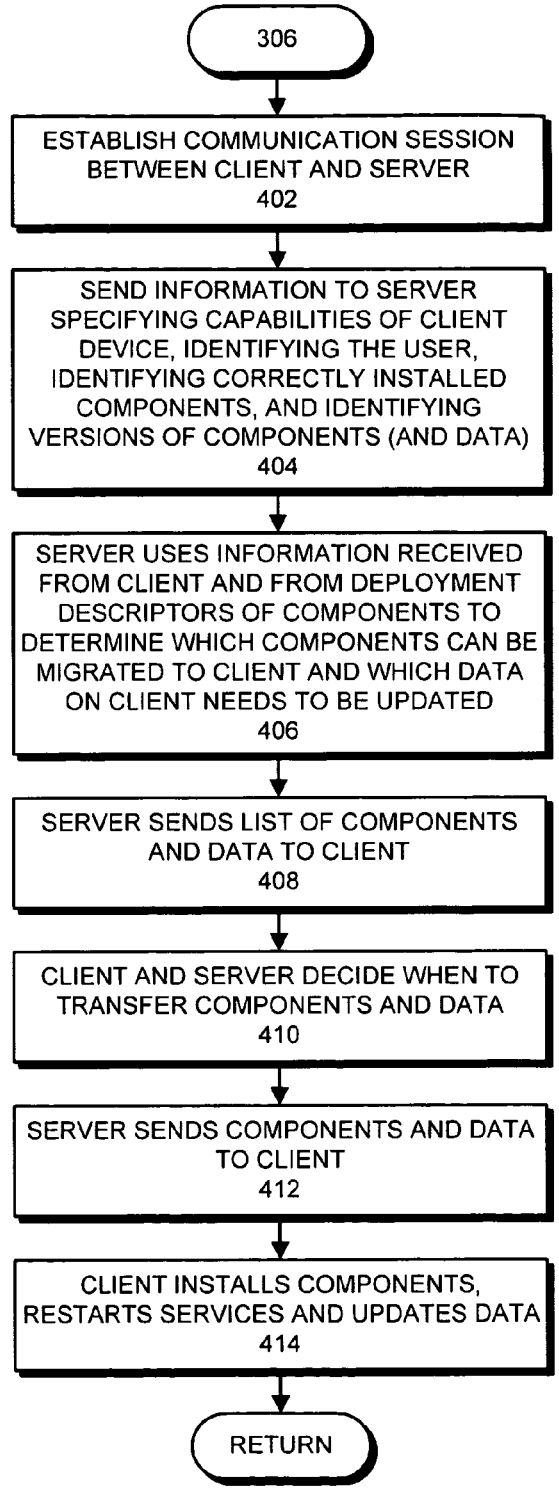
FIG. 4 presents a flow chart illustrating the component migration process in accordance with an embodiment of the present invention.

FIG. 4 presents a flow chart illustrating the component migration process (in step 306 of the flow chart in FIG. 3) in accordance with an embodiment of the present invention. First, the synchronization portion of mJB container 102 establishes a communication session between client 123 and server 121 (step 402). Next, client 123 sends information to server 121 (step 404), wherein the information specifies capabilities of the client computing device and resource availability within the client computing device. This information also identifies: user preferences, currently installed components on client 123, and versions of the currently installed components. This information can also indicate when data items within client 123 were last updated.

Next, server 121 uses this information to determine which components can be migrated to the client 123 and which components need to reside on server 121 (step 406). Server 121 also determines whether data items in client 123 need to be updated.

In one embodiment of the present invention, server 121 examines a deployment descriptor for a given component to determine whether the given component can be migrated to client 123. This deployment descriptor can specify a number of conditions, such as conditions about: network bandwidth and usage, client device capabilities, resource availability within the client device, a user's preferences and usage of services, and features required to execute components. These conditions must be met in order to migrate the given component to the client. For example, the deployment descriptor can specify that the client must have a minimum amount of memory and that there must be a minimum communication bandwidth between the client and the server before the given component can be migrated to the client.

Next, server 121 sends a list of components that are available to be migrated to client 123 (step 408). This list can also specify data that needs to be updated on client 123. This enables client 123 and server 121 to negotiate in order to decide when to transfer components and data to client 123 (step 410). Note that certain components may need to be migrated right away, whereas other components can be migrated at a later time, when network bandwidth becomes available.

Next, server 121 sends components and updated data to client 123 (step 412). Note that a group of related components may have to be transferred at the same time. In this case, client 123 and server 121 must coordinate this group transfer.

Finally, client 123 installs the components and starts (or restarts) services provided by the components (step 414). Client 123 also updates any data items that need to be updated.

Note that in one embodiment of the present invention, components to be migrated are stored in a database, so that migration takes place as part of normal database synchronization between client 123 and server 121.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for deploying components on a client, comprising:
    establishing a communication session through a network connection between the client and a server;
    migrating the components from the sewer to the client selectively, wherein the components provide services and are able to use services provided by other components, and wherein the components each includes a deployment descriptor specifying conditions for determining whether the component should be deployed on the client or the sewer, and wherein migrating the components from the server to the client selectively involves:
        sending information from the client to the sewer specifying capabilities of the client device;
        receiving information at the sewer, wherein the information specifies capabilities of the client device;
        identifying components at the server to migrate to the client based on the received information prior to migrating the components, wherein identifying components to migrate to the client involves:
            determining a list of components that can be migrated to the client, wherein the determination depends on the conditions met in the deployment descriptors of each of the components in the list of components; and
            sending the list to the client;
        transferring the identified components from the server to the client; and
        installing the components on the client, thereby allowing the components to provide services on the client;
    wherein deploying the components on the client facilitates a unified component architecture across the client and the server.

2. The method of claim 1, wherein migrating components from the server to the client also involves:
    allowing the server to identify components to migrate to the client based upon the capabilities of the network connection between the client and the server prior to migrating the components.

3. The method of claim 1, wherein transferring identified components from the server to the client involves:
    receiving a list of components to migrate from the server.

4. The method of claim 1, wherein migrating components from the server to the client involves:
    sending information to the server specifying the status of currently installed components on the client;

allowing the server to identify components to migrate to the client based upon the status of currently installed components; and transferring the identified components from the server to the client.

5. The method of claim 4, wherein the status of currently installed components on the client includes version information for the currently installed components;

wherein the server uses the version information to determine if there exist updated versions of currently installed components on the client; and wherein the server migrates updated versions of currently installed components to the client, if such updated versions exist.

6. The method of claim 1, wherein components to be migrated are stored in a database, so that migration takes place as part of normal database synchronization between the client and the server.

7. The method of claim 1, wherein migrating components from the server to the client involves migrating components when the network connection between the client and the server has available capacity.

8. The method of claim 1, wherein prior to establishing the communication session between the client and the server, the method further comprises updating a client virtual machine upon which the components execute, if the currently installed client virtual machine is outdated.

9. The method of claim 1, wherein prior to establishing the communication session between the client and the server, the method further comprises updating a container within which the components execute on the client, if the container is outdated.

10. The method of claim 1, further comprising synchronizing data between the client and the server.

11. The method of claim 1, wherein the client is a wireless device; and wherein the network connection between the client and the server is a wireless network connection.

12. A computer-readable storage medium storing instructions that when executed by a computer cause the computer to perform a method for deploying components on a client, the method comprising:

establishing a communication session through a network connection between the client and a server;

migrating the components from the server to the client selectively, wherein the components provide services and are able to use services provided by other components, and wherein the components each includes a deployment descriptor specifying conditions for determining whether the component should be deployed on the client or the server, and wherein migrating the components from the server to the client selectively involves;

sending information from the client to the server specifying capabilities of the client device;

receiving information at the server, wherein the information specifies capabilities of the client device;

identifying components at the server to migrate to the client based on the received information prior to migrating the components, wherein identifying components to migrate to the client involves:

determining a list of components that can be migrated to the client, wherein the determination depends on the conditions met in the deployment descriptors of each of the components in the list of components; and sending the list to the client;

transferring the identified components from the sewer to the client; and installing the components on the client, thereby allowing the components to provide services on the client;

wherein deploying the components on the client facilitates a unified component architecture across the client and the server.

13. The computer-readable storage medium of claim 12, wherein migrating components from the server to the client also involves:

allowing the server to identify components to migrate to the client based upon the capabilities of the network connection between the client and the server prior to migrating the components.

14. The computer-readable storage medium of claim 12, wherein transferring identified components from the server to the client involves:

receiving a list of components to migrate from the server.

15. The computer-readable storage medium of claim 12, wherein migrating components from the server to the client involves:

sending information to the server specifying the status of currently installed components on the client;

allowing the server to identify components to migrate to the client based upon the status of currently installed components; and transferring the identified components from the server to the client.

16. The computer-readable storage medium of claim 15, wherein the status of currently installed components on the client includes version information for the currently installed components;

wherein the server uses the version information to determine if there exist updated versions of currently installed components on the client; and wherein the server migrates updated versions of currently installed components to the client, if such updated versions exist.

17. The computer-readable storage medium of claim 12, wherein components to be migrated are stored in a database, so that migration takes place as part of normal database synchronization between the client and the server.

18. The computer-readable storage medium of claim 12, wherein migrating components from the server to the client involves migrating components when the network connection between the client and the server has available capacity.

19. The computer-readable storage medium of claim 12, wherein prior to establishing the communication session between the client and the server, the method further comprises updating a client virtual machine upon which the components execute, if the currently installed client virtual machine is outdated.

20. The computer-readable storage medium of claim 12, wherein prior to establishing the communication session between the client and the server, the method further comprises updating a container within which the components execute on the client, if the container is outdated.

21. The computer-readable storage medium of claim 12, wherein the method further comprises synchronizing data between the client and the server.

22. The computer-readable storage medium of claim 12, wherein the client is a wireless device; and wherein the network connection between the client and the server is a wireless network connection.

23. An apparatus for deploying components on a client, comprising:

a processor;

a communication mechanism configured to establish a communication session through a network connection between the client and a server;

a migration mechanism configured to migrate the components from the server to the client selectively, wherein the components provide services and are able to use services provided by other components, and wherein the components each includes a deployment descriptor specifying conditions for determining whether the component should be deployed on the client or the server, and wherein migrating the components from the server to the client selectively involves;

sending information from the client to the server specifying capabilities of the client device;

receiving information at the server, wherein the information specifies capabilities of the client device;

identifying components at the server to migrate to the client based on the received information prior to migrating the components, wherein identifying components to migrate to the client involves:

determining a list of components that can be migrated to the client, wherein the determination depends on the conditions met in the deployment descriptors of each of the components in the list of components; and sending the list to the client;

transferring the identified components from the server to the client; and an installation mechanism configured to install the components on the client, thereby allowing the components to provide services on the client;

wherein deploying the components on the client facilitates a unified component architecture across the client and the server.

24. The apparatus of claim 23, wherein the migration mechanism is also configured to:

allow the server to identify components to migrate to the client based upon the capabilities of the network connection between the client and the server.

25. The apparatus of claim 23, wherein while transferring identified components from the server to the client, the migration mechanism is configured to:

receive a list of components to migrate from the server.

26. The apparatus of claim 23, wherein the migration mechanism is configured to:

send information to the server specifying the status of currently installed components on the client;

allow the server to identify components to migrate to the client based upon the status of currently installed components; and to transfer the identified components from the sewer to the client.

27. The apparatus of claim 26, wherein the status of currently installed components on the client includes version information for the currently installed components;

wherein the server uses the version information to determine if there exist updated versions of currently installed components on the client; and wherein the server migrates updated versions of currently installed components to the client, if such updated versions exist.

28. The apparatus of claim 23, wherein components to be migrated are stored in a database, so that migration takes place as part of normal database synchronization between the client and the sewer.

29. The apparatus of claim 23, wherein the migration mechanism is configured to migrate components when the network connection between the client and the server has available capacity.

30. The apparatus of claim 23, further comprising a virtual machine updating mechanism, wherein prior to establishing the communication session between the client and the sewer, the virtual machine updating mechanism is configured to update a client virtual machine upon which the components execute, if the currently installed client virtual machine is outdated.

31. The apparatus of claim 23, further comprising a container updating mechanism, wherein prior to establishing the communication session between the client and the server, the container updating mechanism is configured to update a container within which the components execute on the client, if the container is outdated.

32. The apparatus of claim 23, further comprising a data synchronization mechanism that is configured to synchronize data between the client and the server.

33. The apparatus of claim 23, wherein the client is a wireless device; and wherein the network connection between the client and the sewer is a wireless network connection.

34. A means for deploying components on a client, comprising:

a communication means for establishing a communication session through a network connection between the client and a server;

a migration means for migrating the components from the server to the client selectively, wherein the components provide services and are able to use services provided by other components, and wherein the components each includes a deployment descriptor specifying conditions for determining whether the component should be deployed on the client or the server, and wherein migrating the components from the server to the client selectively involves;

sending information from the client to the server specifying capabilities of the client device;

receiving information at the server, wherein the information specifies capabilities of the client device;

identifying components at the server to migrate to the client based on the received information prior to migrating the components, wherein identifying components to migrate to the client involves:

determining a list of components that can be migrated to the client, wherein the determination depends on the conditions met in the deployment descriptors of each of the components in the list of components; and sending the list to the client;

transferring the identified components from the server to the client; and an installation means for installing the components on the client, thereby allowing the components to provide services on the client;

wherein deploying the components on the client facilitates a unified component architecture across the client and the server.

* * * * *

UNITED STATES PATENT AND TRADEMARK OFFICE
CERTIFICATE OF CORRECTION

| | | |
|---|---|---|
| PATENT NO. | : 7,617,273 B2 | Page 1 of 1 |
| APPLICATION NO. | : 10/295728 | |
| DATED | : November 10, 2009 | |
| INVENTOR(S) | : Robert J. Rocchetti et al. | |

It is certified that error appears in the above-identified patent and that said Letters Patent is hereby corrected as shown below:

In claim 1 (at column 6, line 25), please replace the word "sewer" with the word --server--.

In claim 1 (at column 6, line 31), please replace the word "sewer" with the word --server--.

In claim 1 (at column 6, line 33), please replace the word "sewer" with the word --server--.

In claim 1 (at column 6, line 35), please replace the word "sewer" with the word --server--.

In claim 12 (at column 8, line 1), please replace the word "sewer" with the word --server--.

In claim 26 (at column 9, line 50), please replace the word "sewer" with the word --server--.

In claim 28 (at column 9, line 65), please replace the word "sewer" with the word --server--.

In claim 30 (at column 10, line 7), please replace the word "sewer" with the word --server--.

In claim 33 (at column 10, line 25), please replace the word "sewer" with the word --server--.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,617,273 B2 | Page 1 of 1 |
| APPLICATION NO. | : 10/295728 | |
| DATED | : November 10, 2009 | |
| INVENTOR(S) | : Rocchetti et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this

Nineteenth Day of October, 2010

David J. Kappos
*Director of the United States Patent and Trademark Office*